United States Patent

O'Neal et al.

[15] 3,677,630

[45] July 18, 1972

[54] AUDIO-VISUAL DISPLAY APPARATUS FOR RECEIVING CARTRIDGES CONTAINING AUDIO VISUAL INFORMATION

[72] Inventors: Donald V. O'Neal, River Grove; Edward T. Kizielewski, Chicago, both of Ill.

[73] Assignee: Motorola, Inc., Franklin Park, Ill.

[22] Filed: Aug. 20, 1970

[21] Appl. No.: 65,451

[52] U.S. Cl. ....................353/15, 353/120

[51] Int. Cl. ....................G03b 31/00

[58] Field of Search ....................353/15, 19, 120

[56] References Cited

UNITED STATES PATENTS

| | | | |
|---|---|---|---|
| 3,252,372 | 5/1966 | Gallina | 353/15 |
| 3,556,654 | 1/1971 | Stapleton | 353/15 |
| 3,389,953 | 6/1968 | Gerry | 353/15 |
| 3,582,195 | 6/1971 | Pignone | 353/15 X |

*Primary Examiner*—William D. Martin, Jr.
*Attorney*—Mueller and Aichele

[57] ABSTRACT

An apparatus for receiving a cartridge having the physical characteristics of an eight track stereo cartridge and capable of playing such eight track cartridges while principally being designed to accommodate cartridges containing audio-visual information. The apparatus has an entryway for receiving the cartridge and a pawl mechanism located in the entryway to be pivotally moved when engaged by the cartridge as it is inserted or removed from the entryway. The pawl rotates into position and enters an opening in the cartridge to engage notches formed in a film disc. The pawl is then selectively axially actuated, in a direction transverse to its pivotal direction, to advance the film disc in the cartridge a step at a time.

4 Claims, 5 Drawing Figures

Patented July 18, 1972 | 3,677,630

2 Sheets-Sheet 1

INVENTORS
DONALD O'NEAL
EDWARD T. KIZIELEWSKI
BY Mueller & Aichele
ATTORNEYS

INVENTORS.
DONALD O'NEAL
EDWARD T. KIZIELEWSKI

BY Mueller & Aichele

ATTORNEYS.

AUDIO-VISUAL DISPLAY APPARATUS FOR RECEIVING CARTRIDGES CONTAINING AUDIO VISUAL INFORMATION

BACKGROUND OF THE INVENTION

This invention relates generally to an audio-visual display apparatus, and more particularly, to audio-visual display apparatus of the type which synchronizes the audio information with the visual display being presented.

Heretofore, several approaches to audio-visual display have been undertaken which were adequately successful for the general purpose intended. Audio-visual display apparatus heretofore generally found use as a training aid for teaching, for example, foreign languages, or the like. In some instances, the audio-visual apparatus would be used as an entertainment device.

In the apparatus heretofore contemplated, the audio information would be recorded on a magnetic tape or disc records of the well-known type which would be played substantially on its own independent reproducing mechanism. In like manner, a film strip or film slide arrangement would be incorporated to be operated by its own operating mechanism to provide the corresponding visual display. Means would be provided to synchronize the audio signal information with the video signal information, this generally taking the form of a high frequency tone, or the like, generated by a signal on the magnetic tape or record to advance the film strip of slide cartridge to the next position.

In any event, audio-visual display apparatus of the prior art would require relatively complex and cumbersome equipment to accommodate the audio medium as well as the video medium. In some cases, a completely separate record player or tape player is required and is used with a completely separate slide projector or movie camera, and the only interrelation between the two is a synchronizing signal. This type of arrangement is relatively expensive and requires a large amount of space.

SUMMARY OF THE INVENTION

Accordingly, it is an object of this invention to provide an improved audio-visual display apparatus for receiving a simple cartridge containing both the audio and visual display medium within the cartridge.

Another object of this invention is to provide an improved audio-visual display apparatus which can be used to receive cartridges both of the type containing audio-visual mediums and of the type containing only audio medium therein.

BRIEF DESCRIPTION OF THE DRAWINGS

It will be understood that like reference numerals throughout the various views of the drawings are intended to designate similar elements or components and wherein.

DETAILED DESCRIPTION OF THE PREFERRED EMBODIMENT

Figure 1:
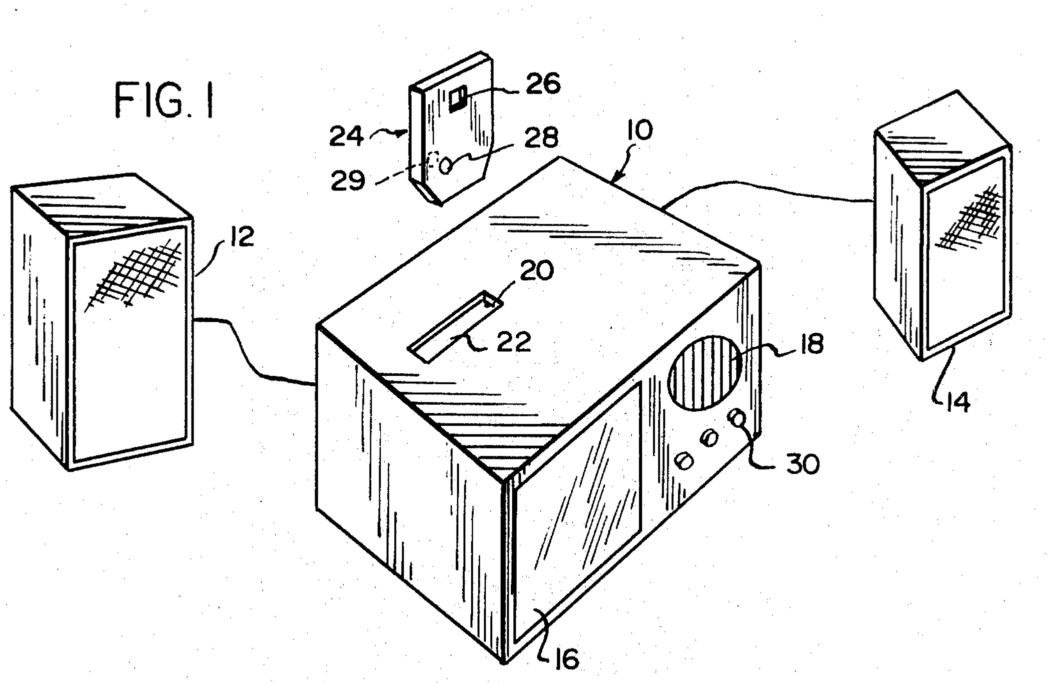
FIG. 1 is a perspective view of an audio-visual display system constructed in accordance with principals of this invention.

Seen in FIG. 1 is an audio-visual display system comprising an audio-visual display apparatus 10 which may include a pair of remote stereo speakers 12 and 14 electrically connected thereto. The speakers 12 and 14 may be positioned at any convenient location relative to the display apparatus 10 and may be sized to fit on a bookshelf or bar, or the like. The display apparatus 10 is sized to be positioned in a relatively small area, such as a bar top or similar location, where friendly gatherings of people take place, or in a small quiet plate where one can study. The display apparatus 10 includes a visual display panel 16, which may be substantially transparent, similar to ground glass, to receive a projected image at the rear surface of the panel and display this image at the front surface thereof. A built-in speaker 18 may be provided on the display apparatus 10 so that the unit is still a more compact apparatus and the remote speakers 12 and 14 are not required.

Most advantageously, an entryway 20 is provided, preferably at the top wall of the apparatus 10, and may include a spring door 22 which acts as a dust protector when the display apparatus 10 in not is use. A cartridge 24, of a standard size and configuration corresponding to a stereo eight track cartridge, contains audio and visual medium therein to be actuated merely by inserting the cartridge into the entry way and running it home in the same manner as a stereo eight cartridge is inserted into a conventional tape player. The cartridge 24 includes an opening 26 which exposes notches formed on a film disc, to be described hereinbelow, and aligned apertures 28 and 29 through opposite wall of the cartridge so that a light beam can pass to display the image of a film which is interposed between the aligned apertures. The display apparatus 10 includes a suitable light source behind the cartridge to project the light beam in the usual manner and through a corresponding aligned lens arrangement 81 so that visual information is properly positioned on the display panel 16.

If desired, the display apparatus 10 includes means for turning the apparatus on when the cartridge 24 is inserted into the entryway 20 and for turning the apparatus off when the cartridge 24 is removed, or at least partially removed, from its full inserted position.

The film segments on the film disc within the cartridge and the audio segments on the magnetic tape within the cartridge are synchronized by, for example, a high frequency tone, or other signal, which is recorded on the magnetic tape and utilized to actuate a solenoid or motor circuit to advance the film disc one position at a time for each tone signal so generated. However, a manual means may be provided, here illustrated as one of the knobs 30, to cause step by step advancement of the film disc so that the proper film frame can be synchronized with the audio signal information being then reproduced. Once the film disc and the magnetic tape are synchronized together, they will remain synchronized during the entire playing operation.

Figure 2:
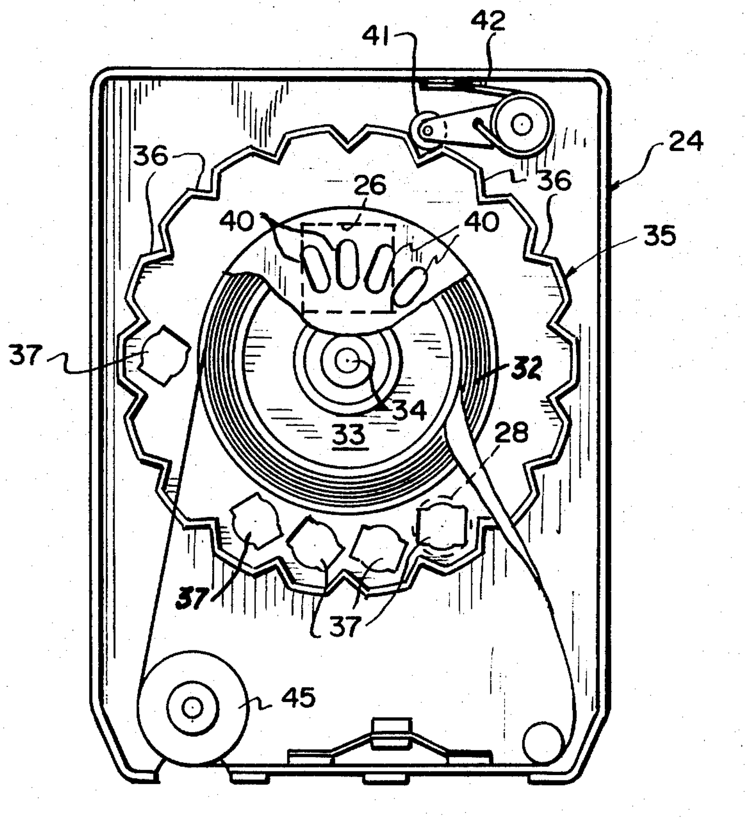
FIG. 2 is a plan view of a cartridge, with the top cover removed and which contains both audio and visual medium in accordance with this invention.

Referring now to FIG. 2, the cartridge 24 is shown with the top surface thereof removed to expose both the audio and visual mediums therein. The audio medium is a quantity of endless magnetic tape 32 wrapped about a support spool 33 which, in turn, is secured within the cartridge 24 at the axis 34 for rotation thereabout. Also secured to the axis 34 is a film disc 35 which is independently rotatable with respect to the magnetic tape 32, and which has a plurality of detents 36 formed about the periphery of the disc. Each detent 36 corresponds to one of a plurality of film segments 37 positioned about the disc 35 on a uniform radius so that each film disc ultimately will come in registry between the aligned apertures 28 and 29, here only aperture 28 being illustrated, to be projected on the display panel 16.

On a radius inwardly of the film segments 37 is located a corresponding plurality of notch means or slots 40 which are exposed through the wall of the cartridge 24 by the opening 26. The notches 40 engage an advancing pawl 70, of FIG. 3, which advances the film disc 35 one segment at a time for each actuation of the pawl. To hold the film disc 35 firmly in position while a particular one of the film segments 37 is being projected, a spring biased roller 41 engages the detents 36 under the force of a spring 42.

In the conventional manner, a drive roll 45 is mounted within the cartridge 24 and the magnetic tape 32 is wrapped thereabout to be transported upon engaging the cartridge with a drive capstan, not shown. Also, a magnetic pick-up engages the tape medium in the usual manner to reproduce the audio signal information on tape. The cartridge illustrated in FIG. 2 therefore contains the entire quantity of correlated audio and visual information which will be reproduced together to give a total audio-visual effect which can be utilized for either entertainment or as a training aid.

Figure 3:
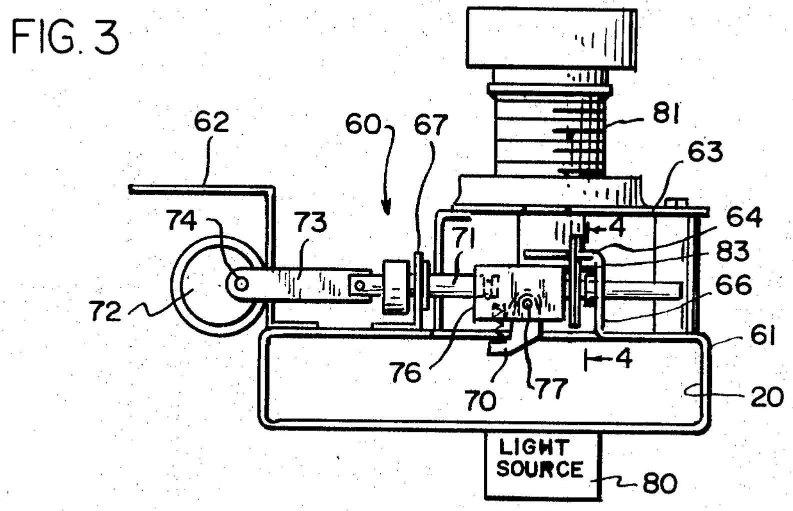
FIG. 3 is a top view of a portion of the film advancing mechanism within the display apparatus of this invention.

FIG. 3 illustrates a fragmentary top view of the entryway 20 and associated pawl mechanisms for advancing the film disc 35, of FIG. 2, one film segment at a time. Here, the pawl mechanism is designated generally by reference numeral 60 and includes the support structure members 61, 62 and 63, which may be of sheet or cast material. An extended stop finger 64 is supported by a bearing support 66 protruding from the support section 61 to limit the extent that the pawl actuator 70 can rotate about the support shaft 71. An additional support 67 is provided on the support structure 61 to provide a bearing member for the shaft 71. The shaft 71 is free to rotate about its axis so that the pawl 70 is freely pushed or pulled out of the way when a cartridge is inserted into the entryway 20 or removed therefrom. However, the shaft 71 is axially actuated by a motor driven eccentric 72 pivotally connected to a rod 73 by a connector pin 74. When the cartridge 24 is inserted into the entryway 20, the pawl is initially pushed down and out of the way until such time as the cartridge is run completely home so that the pawl will then flip back to its normal position thereby entering the opening 26 on the cartridge 24 and engage the then aligned notch 40 exposed by the opening 26. After the cartridge is inserted in the entryway, the motor driven eccentric 72 will actuate the pawl 70 back and forth during each revolution of the eccentric to index the film disc 35 one film segment at a time. A signal for the motor drive eccentric 72 preferably is obtained by a high frequency, substantially inaudible, signal prerecorded on the magnetic tape so that the film disc will advance when the next segment of audio information is being reproduced to coincide therewith.

The shaft 71 has a block member 76 from which extends the pawl 70 and is secured to the block 76 by a pivot pin 77. The pivot pin 77 allows the pawl to pivot sideways out of engagement with the notch 40 when the shaft 71 is retracted or returned to its initial film advancing position. That is, when the shaft 71 is pulled to the left, in FIG. 3, pawl 70 will engage a corresponding notch 40 of the film disc 35 and advance the film disc one film segment. However, when shaft 71 returns to its initial position, pawl 70 must rotate or fold to the side and out of the way.

A light source 80 is provided, and is of any suitable light source for projecting a light beam through the aligned apertures 28 and 29 of the cartridge 24 so that the image can be translated through a lens structure 81 which will display the image at the rear surface of the display screen 16. As mentioned hereinabove, the display screen 16 is of the type which allows the image to appear at the front surface thereof.

Figure 4:
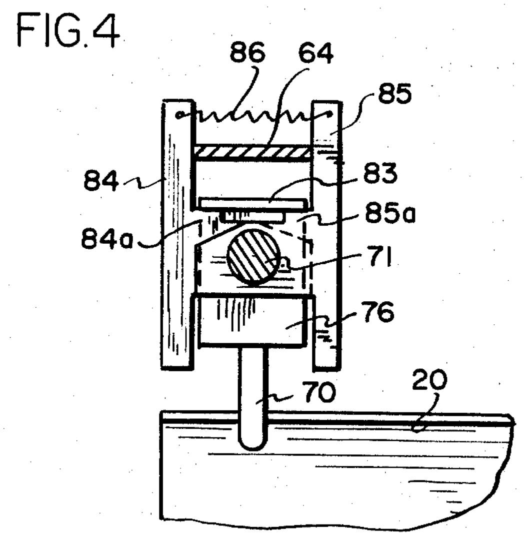
FIGS. 4 and 5 illustrate operational characteristics of the mechanism shown in FIG. 3.
Figure 5:
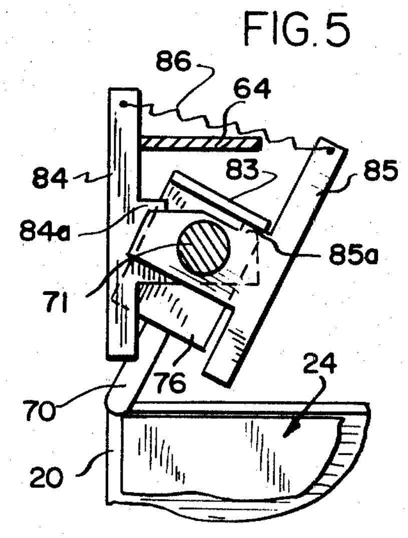

FIGS. 4 and 5 illustrate more fully the pivotal relationship of the pawl 70, about the shaft 71, under the influence of inserting or retracting the cartridge 24. Here it can be seen that the block portion 76 includes a slight extended flange portion 83 which engages on each side thereof corresponding notched portions **84*a* and 85*a* of extended arm members 84 and 85, respectively. The extended arm members 84 and 85 are tied together by a small coil spring 86, or the like, so that pressure on the pawl 70 will rotate the shaft and move the pawl out of the way. This will also move one of the extended arm members, as seen in FIG. 5, to displace it from the stop finger 64. As the other arm member remains in its fixed position, the displaced arm member will be forced back to the neutral position by the spring 86 so that the pawl 70 will then return to a position located in the entryway 20 to engage the notches 40**, as mentioned hereinabove.

What has been described is a simple and novel arrangement for providing an actuating pawl to be positioned in the entryway of a cartridge receiving apparatus so that the pawl can be shifted out of the way under both insertion and retraction of the car cartridge from the entryway. This arrangement allows a cartridge to contain both the audio and the visual mediums, and allows such mediums to be activated merely by inserting the cartridge into the audio-visual apparatus. Variations and modifications of this invention may be effected without departing from the spirit and scope of the novel concepts disclosed and claimed herein.

We claim:

1. A film transport and tape player system comprising, in combination:

a cartridge containing photographic film and magnetic tape with openings in the cartridge to allow engagement of external means to transport the film and magnetic tape independently of one another;

apparatus having an entryway for receiving said cartridge to provide a visual display of a particular film segment while simultaneously reproducing a corresponding audio segment from said magnetic tape;

a disc within said cartridge supporting the photographic film with the film segments annularly positioned thereabout, said disc having corresponding notch means associated with each film segment to receive an advancing means from said apparatus to advance the disc upon a predetermined signal; and advancing means positioned within said entry way comprising a pawl and mounting means for said pawl, said mounting means including a first axial portion for guiding said pawl in a linear direction between first and second positions, said mounting means further including a second coupling portion for permitting said pawl to rotate about said axial portion, with said cartridge being positioned in the player entryway the same strikes said pawl and rotates the same in one direction about said axial portion of said mounting means to permit full insertion of the cartridge whereby said pawl engages said notch means, said advancing means subsequently being responsive to said predetermined signal to linearly move said pawl from said first position to said second position thereby rotating said film disc to position a different film segment for viewing, and with said cartridge being withdrawn from said player, said pawl strikes said notch means to rotate said pawl about said axial portion of said mounting means in a direction opposite said one direction thereby disengaging said pawl from said film disc to permit retraction of the cartridge.

2. The film transport and tape player system of claim 1 wherein said advancing means further includes solenoid means for moving said axial portion of said mounting means linearly to pull said pawl through a predetermined distance so that engagement of said pawl with said notch means on said film disc will advance the film disc one film segment to place a subsequent film segment in position for display.

3. The film transport and tape player system of claim 1 wherein said coupling portion of said mounting means includes a pair of extended arms pivotally secured thereto and spaced on either side of said axial portion; a stop member interposed between said extended arms to limit movement of said arms to cause said pawl to normally be in position in said passageway; and spring means connected between said extended arms for urging said extended arms resiliently together to each side of said stop member to position said pawl in said passageway, whereby rotational movement of said pawl in either direction about said axial portion will cause said pawl to be pushed aside under the spring bias of said spring means in either direction.

4. A display apparatus including in combination, an entryway for receiving a cartridge which contains both a film disc having discrete film segments thereon and notch means associated with each film segment, and a quantity of magnetic tape having a plurality of discrete audio segments, tape drive means at the end of said entryway for transporting the magnetic tape within a cartridge when inserted therein, audio reproduction means to playback the audio signal information of each segment on the magnetic tape, light projection means to direct a light beam through the aligned apertures of an inserted cartridge to display the image on the film, advancing means including a pawl extending into said entryway, a shaft secured to said pawl which includes a pair of extended arms pivotally secured thereto and spaced on either side thereof, a stop member interposed between said extended arms to limit the movement of said arms, spring means connected between said extended arms and urging said extended arms resiliently together on each side of said stop member to position said pawl normally in said entryway, whereby movement of said pawl in either direction transversely of the axis of said shaft will cause said pawl to be pushed aside against the spring bias of said spring means in either direction, the combination further including, means for actuating said shaft axially to pull the pawl through a predetermined distance so that engagement of said pawl with the notch means on said film disc within a cartridge will advance the film disc one segment to place a subsequent film segment in registry with said light projecting means.

* * * * *